United States Patent
Matsumoto

(10) Patent No.: US 11,463,117 B2
(45) Date of Patent: Oct. 4, 2022

(54) RADIO FREQUENCY MODULE AND COMMUNICATION DEVICE

(71) Applicant: Murata Manufacturing Co., Ltd., Nagaokakyo (JP)

(72) Inventor: Naoya Matsumoto, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/168,196

(22) Filed: Feb. 5, 2021

(65) Prior Publication Data

US 2021/0266020 A1 Aug. 26, 2021

(30) Foreign Application Priority Data

Feb. 21, 2020 (JP) .............................. JP2020-027829

(51) Int. Cl.
*H04B 1/04* (2006.01)
*H04B 1/40* (2015.01)

(52) U.S. Cl.
CPC ......... *H04B 1/0458* (2013.01); *H04B 1/0475* (2013.01); *H04B 1/0483* (2013.01); *H04B 2001/0408* (2013.01)

(58) Field of Classification Search
CPC ...... H04B 1/04; H04B 1/0458; H04B 1/0475; H04B 1/0483; H04B 2001/0408; H04B 1/0053; H04B 1/0057; H04B 1/006; H04B 1/0064; H04B 1/0078; H04B 1/38; H04B 1/40; H04B 1/44; H04B 1/48; H04B 1/525; H04B 10/40; H04M 1/02; H04M 1/0277; H04M 1/0274; H04W 52/243; H04W 52/52; H04W 88/06

See application file for complete search history.

(56) References Cited

U.S. PATENT DOCUMENTS

| | | | | |
|---|---|---|---|---|
| 7,088,971 | B2 * | 8/2006 | Burgener | H04B 1/48 455/127.1 |
| 7,978,031 | B2 * | 7/2011 | Goi | H04B 1/03 333/247 |
| 8,073,400 | B2 * | 12/2011 | Gorbachov | H04B 1/0057 455/83 |
| 10,461,799 | B2 * | 10/2019 | Yeh | H04B 1/48 |
| 10,554,180 | B2 * | 2/2020 | Takenaka | H04B 1/525 |
| 2008/0111226 | A1 | 5/2008 | White et al. | |
| 2017/0055341 | A1 | 2/2017 | Ma | |
| 2018/0096951 | A1 * | 4/2018 | Chen | H01L 23/552 |

FOREIGN PATENT DOCUMENTS

WO 2018/037969 A1 3/2018

\* cited by examiner

*Primary Examiner* — Quochien B Vuong
(74) *Attorney, Agent, or Firm* — Xsensus LLP

(57) ABSTRACT

A radio frequency module includes: a power amplifier; an inductor connected between the power amplifier and a power-supply terminal to supply a power-supply voltage to the power amplifier; a capacitor connected between a ground and a node that is located between the inductor and the power-supply terminal; a module substrate including a first principal surface and a second principal surface opposite to each other; and a plurality of post electrodes disposed on the second principal surface. Here, the inductor is disposed on the first principal surface or inside of the module substrate, and at least one of the power amplifier or the capacitor is disposed on the second principal surface.

20 Claims, 6 Drawing Sheets

RADIO FREQUENCY MODULE AND COMMUNICATION DEVICE

CROSS REFERENCE TO RELATED APPLICATION

The present application is based on and claims priority of Japanese Patent Application No. 2020-027829 filed on Feb. 21, 2020. The entire disclosure of the above-identified application, including the specification, drawings and claims is incorporated herein by reference in its entirety.

TECHNICAL FIELD

The present disclosure relates to a radio frequency module and a communication device.

BACKGROUND

In a mobile communication device such as a mobile phone, the number of circuit elements included in a radio frequency front-end circuit increases with the progress particularly in multiband communications.

United States Patent Application Publication No. 2008/0111226 discloses a technology of forming a passive device, such as a capacitor, in a conductive layer that is located between two organic dielectric layers inside of a multi-layer substrate.

SUMMARY

Technical Problems

However, as recognized by the present inventor, further downsizing is awaited of the radio frequency module of the conventional technology.

In view of the above, the present disclosure provides a radio frequency module and a communication device that enable further downsizing.

Solutions

The radio frequency module according to an aspect of the present disclosure includes: a power amplifier; an inductor connected between the power amplifier and a power-supply terminal to supply a power-supply voltage to the power amplifier; a capacitor connected between a ground and a node that is located between the inductor and the power-supply terminal; a module substrate including a first principal surface and a second principal surface opposite to each other; and a plurality of external-connection terminals disposed on the second principal surface. Here, the inductor is disposed on the first principal surface or inside (as used herein, "inside" of the module substrate should be construed as (i) at least partially within the substrate module by being at least partially beneath a plane of the first principle surface of the module substrate, (ii) within the module substrate and fully below the plane of the first principle surface but not covered by the module substrate on an upper surface of the inductor, or (iii) encapsulated within the substrate module below the first principle surface) of the module substrate, and at least one of the power amplifier or the capacitor is disposed on the second principal surface.

Advantageous Effects

The present disclosure is capable of providing a radio frequency module and a communication device that enable further downsizing.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
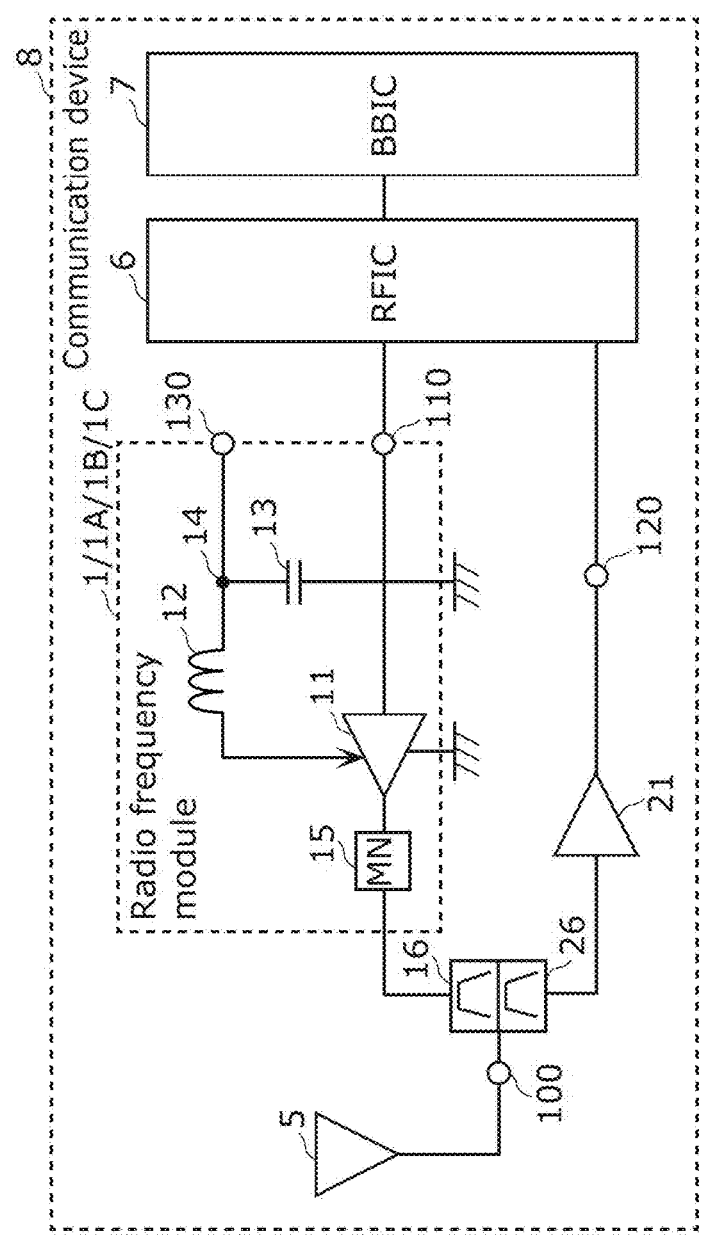
FIG. 1 is a diagram showing the circuit configurations of each radio frequency module and a communication device according to Embodiments 1 through 4.

The following describes in detail the embodiments according to the present disclosure with reference to the drawings. Note that the following embodiments show a comprehensive or specific example of the present disclosure. The numerical values, shapes, materials, structural elements, the arrangement and connection of the structural elements, etc. shown in the following embodiments are mere examples, and thus are not intended to limit the present disclosure.

Note that the drawings are schematic diagrams in which emphasis, omission, or ratio adjustment has been applied where necessary to illustrate the present disclosure. The drawings are thus not necessarily exact illustration of the present disclosure, and may illustrate shapes, positional relationships, and ratios differently from the actual ones. In the drawings, substantially the same structural elements are assigned the same reference marks, and their repetitive description may be omitted or simplified.

In the drawings, the x axis and the y axis are orthogonal to each other on a plane that is parallel to a principal surface of a module substrate. Also, the z axis is normal to a principal surface of the module substrate. The positive direction and the negative direction of the z axis indicate the upward direction and the downward direction, respectively.

Embodiment 1

[1 Circuit Configurations of Radio Frequency Module 1 and Communication Device 8]

With reference to FIG. 1, the following describes the circuit configurations of radio frequency module 1 and communication device 8 according to the present embodiment. FIG. 1 is a diagram showing the circuit configurations of radio frequency module 1, 1A, 1B, and 1C, and communication device 8 according to Embodiments 1 through 4.

In the following description of the circuit configurations, "connected" means not only the case where elements are electrically connected via a wiring conductor, a terminal, a connector, a switch, or any combination of these, but also the case where elements are electrically connected via a passive element and/or an active element. Also, "connected between A and B" means that an element is disposed on a path that connects A and B and connected to both A and B.

[1.1 Circuit Configuration of Communication Device 8]

Communication device 8 is a device used in a communication system. Examples of communication device 8 include a smartphone and a tablet computer. As shown in FIG. 1, communication device 8 includes radio frequency module 1, transmission filter 16, reception filter 26, low-noise amplifier 21, antenna 5, RFIC 6, and BBIC 7.

Antenna 5 is connected to antenna connection terminal 100. Antenna 5 transmits a radio frequency signal outputted from radio frequency module 1. Antenna 5 also receives a radio frequency signal from outside and outputs the received radio frequency signal to radio frequency module 1.

RFIC 6 is an exemplary signal processing circuit that processes a radio frequency signal. More specifically, RFIC 6 performs signal processing, such as up-conversion, on a transmission signal inputted from BBIC 7, and outputs the resulting radio frequency signal to transmission input terminal 110 of radio frequency module 1.

RFIC 6 also performs signal processing, such as down-conversion, on a radio frequency signal inputted from antenna 5 via reception filter 26 and low-noise amplifier 21, and outputs the resulting reception signal to BBIC 7.

BBIC 7 is a circuit that performs signal processing by use of an intermediate frequency band, the frequency of which is lower than that of a radio frequency signal propagating through radio frequency module 1. The signal processed by BBIC 7 is used, for example, as an image signal for image display, or as a sound signal for telephone conversation through a speaker.

Low-noise amplifier 21 is connected between reception filter 26 and reception output terminal 120. Low-noise amplifier 21 performs low-noise amplification on a radio frequency signal inputted via reception filter 26, and outputs the resulting signal to RFIC 6.

Transmission filter 16 is connected between matching circuit 15 of radio frequency module 1 and antenna connection terminal 100. Transmission filter 16 passes radio frequency signals in a predetermined transmission band among the radio frequency signals amplified by power amplifier 11.

Reception filter 26 is connected between low-noise amplifier 21 and antenna connection terminal 100. Reception filter 26 passes radio frequency signals in a predetermined reception band among the radio frequency signals inputted from antenna connection terminal 100.

Transmission filter 16 and reception filter 26 according to the present embodiment are included in a duplexer that is capable of simultaneous transmission and reception of radio frequency signals in a predetermined frequency band. Note that a circuit element such as a switch may be connected between transmission filter 16 and antenna connection terminal 100 and between reception filter 26 and antenna connection terminal 100.

Non-limiting examples of each of transmission filter 16 and reception filter 26 include a surface acoustic wave filter, an acoustic wave filter utilizing bulk acoustic wave (BAW), an LC resonant filter, and a dielectric filter.

Note that antenna 5 and BBIC 7 are not essential structural elements of communication device 8 according to the present embodiment. Communication device 8 may not also include reception filter 26, low-noise amplifier 21, and reception output terminal 120. In this case, communication device 8 serves as a transmission device that transmits radio frequency signals in a predetermined transmission band.

Also, transmission filter 16, reception filter 26, and low-noise amplifier 21, or any combination of these may be included in radio frequency module 1. Stated differently, power amplifier 11, inductor 12, capacitor 13, matching circuit 15, transmission filter 16, reception filter 26, and low-noise amplifier 21 may be mounted on the same module substrate.

Communication device 8 according to the present embodiment may also be a circuit (or circuitry having one or more circuits) for transferring radio frequency signals in a plurality of communication bands, in addition to a predetermined communication band. In this case, communication device 8 may include a plurality of power amplifiers, a plurality of low-noise amplifiers, a plurality of transmission filters, a plurality of reception filters, and a switch for switching between connecting a plurality of transmission filters and reception filters.

[1.2 Circuit Configuration of Radio Frequency Module 1]

The following describes the configuration of radio frequency module 1 that transfers a radio frequency signal processed by RFIC 6. As shown in FIG. 1, radio frequency module 1 includes power amplifier 11, inductor 12, capacitor 13, and matching circuit 15.

Power amplifier 11 amplifies a transmission signal inputted from transmission input terminal 110 and outputs the resulting signal to transmission filter 16, using a power-supply voltage supplied via inductor 12 from power-supply terminal 130. Power amplifier 11 is implemented, for example, as a complementary metal oxide semiconductor (CMOS) or GaAs electric field effect transistor (FET), a CMOS or GaAs heterojunction bipolar transistor (HBT), etc.

Inductor 12 is connected between power amplifier 11 and power-supply terminal 130 for supplying a power-supply voltage to power amplifier 11. Inductor 12 inhibits a radio frequency signal from entering the power-supply line for supplying a power-supply voltage. Stated differently, inductor 12 is implemented, for example, as a choke coil.

Capacitor 13 is connected between the ground and node 14 that is located between inductor 12 and power-supply terminal 130. Capacitor 13 reduces variations in power-supply voltage and inhibits noise from entering the radio frequency signal line. Stated differently, capacitor 13 is implemented as a bypass capacitor or a decoupling capacitor.

Matching circuit 15 is connected between power amplifier 11 and transmission filter 16. Matching circuit 15 (or matching network) matches the impedance between power amplifier 11 and transmission filter 16. Matching circuit 15 includes an inductor and/or a capacitor. Matching circuit 15 may not be included in radio frequency module 1.

[2 Component Disposition of Radio Frequency Module 1]

Figure 2:
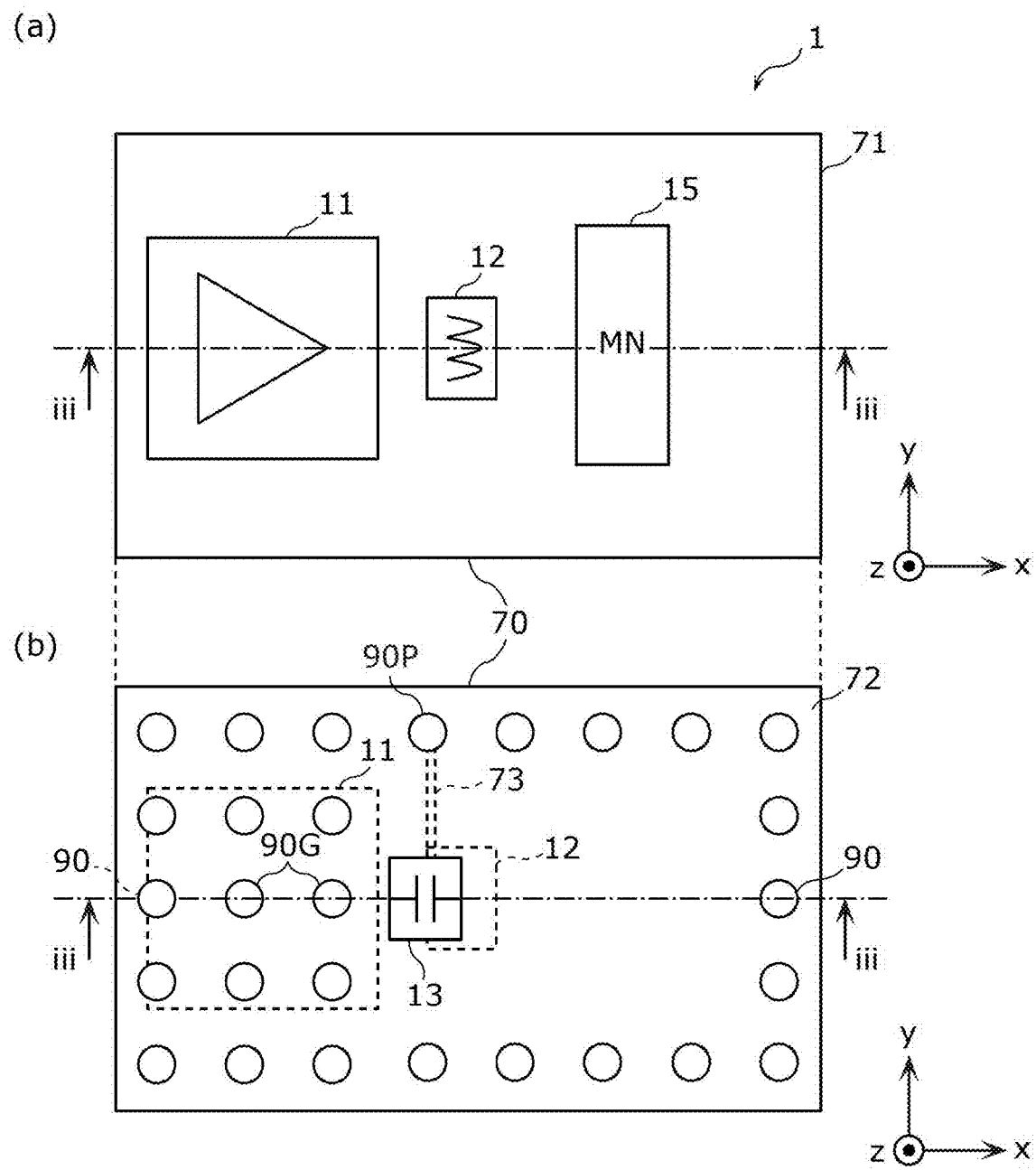
FIG. 2 is a plan view of the radio frequency module according to Embodiment 1.
Figure 3:
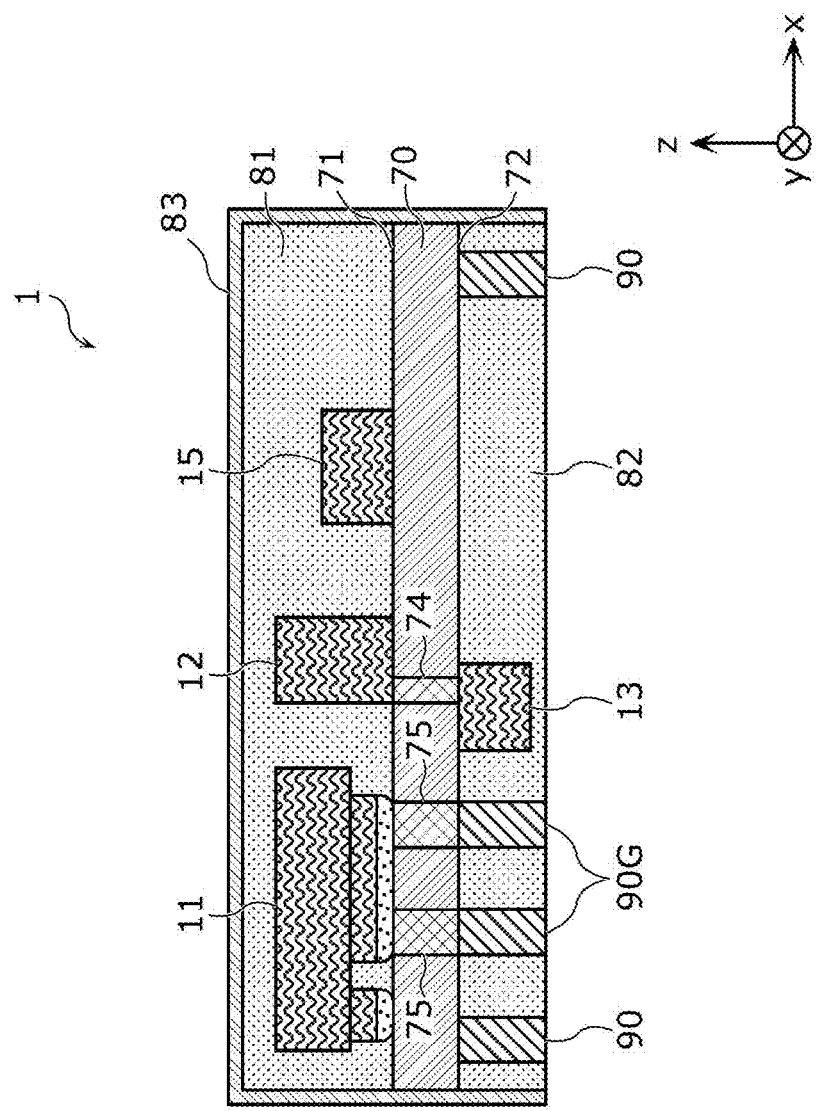
FIG. 3 is a cross-sectional view of the radio frequency module (or RF front-end circuitry) according to Embodiment 1.

With reference to FIG. 2 and FIG. 3, the following specifically describes the component disposition of radio frequency module 1 with the above configuration.

Note that in the following description of the component disposition, "in a plan view of the module substrate" means a view of an object that is orthographically projected onto the xy plane and seen from the z direction. Also, "a component is disposed on a principal surface of the module substrate" means not only the case where the component is disposed on the principal surface in contact with the principal surface of the module substrate, but also the cases where the component is disposed above the principal surface without contacting the principal surface and where the component is partially embedded in the substrate from the side of the principal surface. Also, "A overlaps B or A does not overlap B in a plan view of the module substrate" means that the region of A that is orthographically projected onto the xy plane overlaps or does not overlap the region of B that is orthographically projected onto the xy plane.

FIG. 2 is a plan view of radio frequency module 1 according to Embodiment 1. In FIG. 2, (a) is a view of principal surface 71 of module substrate 70 seen from the positive direction of the z axis, and (b) is a perspective view of principal surface 72 of module substrate 70 seen from the positive direction of the z axis. In (b) in FIG. 2, the dashed lines indicate an object inside (as defined above) of module substrate 70 or on principal surface 71 of module substrate 70.

FIG. 3 is a cross-sectional view of radio frequency module 1 according to Embodiment 1. FIG. 3 shows a cross-section of radio frequency module 1 cut along iii-iii line shown in FIG. 2.

As shown in FIG. 2 and FIG. 3, radio frequency module 1, which is a packaged module, further includes module substrate 70, resin members 81 and 82, shield electrode layer 83, and a plurality of post electrodes 90, in addition to the electronic components that include the circuit elements shown in FIG. 1. Note that FIG. 2 omits the illustration of resin members 81 and 82, and shield electrode layer 83 to illustrate the components.

Module substrate 70 includes principal surfaces 71 and 72 opposite to each other. Components are disposed on principal surfaces 71 and 72. Non-limiting examples of module substrate 70 to be used include: a low temperature co-fired ceramics (LTCC) substrate including stacked dielectric layers; a high temperature co-fired ceramics (HTCC) substrate including stacked dielectric layers; a component-embedded substrate; a substrate having a redistribution layer (RDL); and a printed circuit board.

Principal surface 71 of module substrate 70, which is an example of the first principal surface, is also referred to as an upper surface or a surface. As shown in (a) in FIG. 2, disposed on principal surface 71 are power amplifier 11, inductor 12, and matching circuit 15. As shown in FIG. 3, these components on principal surface 71 are sealed by resin member 81.

Principal surface 72 of module substrate 70, which is an example of the second principal surface, is also referred to as a lower surface or a back surface. As shown in (b) in FIG. 2, disposed on principal surface 72 are capacitor 13 and a plurality of post electrodes 90. As shown in FIG. 3, these components on principal surface 72 are sealed by resin member 82.

Shield electrode layer 83 is a metal thin film formed, for example, by sputtering. Shield electrode layer 83 covers principal surface 71 and side surfaces of module substrate 70. Shield electrode layer 83 is set at ground potential and inhibits extraneous noise from entering radio frequency module 1.

A plurality of post electrodes 90 is an example of a plurality of external-connection terminals. Each of a plurality of post electrodes 90 protrudes through resin member 82 from principal surface 72 in the negative direction of the z axis. One end of each of post electrodes 90 is exposed from resin member 82 and connected to an input and output terminal and/or a ground electrode, and so forth on the mother board that is disposed at the negative side of the z axis of radio frequency module 1. A plurality of post electrodes 90 include post electrodes 90G implemented as electrodes for heat dissipation of power amplifier 11 and post electrode 90P implemented as power-supply terminal 130. Post electrodes 90G and post electrode 90P are connected, for example, to ground electrodes and a power-supply electrode on the mother board, respectively.

As shown in (b) in FIG. 2, at least part of a footprint of capacitor 13 overlaps at least part of a footprint of inductor 12 in a plan view of module substrate 70. Inductor 12 and capacitor 13 are interconnected by way of via-conductor 74 located inside of module substrate 70. Via-conductor 74 is connected to post electrode 90P via planar wiring trace 73 located inside of module substrate 70.

Note that via-conductor 74 is illustrated in FIG. 3 as a conductor filled in a through-via that penetrates through module substrate 70 along the z axis, but the present disclosure is not limited to this configuration. Via-conductor 74 may thus include, for example, a conductor filled in a blind via located at the side of principal surface 71, a conductor filled in a blind via located at the side of principal surface 72, and a planar wiring trace that connects these conductors inside module substrate 70.

Also, in a plan view of module substrate 70, power amplifier 11 does not overlap capacitor 13 but overlaps post electrodes 90G for heat dissipation. Power amplifier 11 is connected to post electrodes 90G by way of via-conductors 75 located inside of module substrate 70.

[3 Effects, Etc.]

As described above, radio frequency module 1 according to the present embodiment includes: power amplifier 11; inductor 12 connected between power amplifier 11 and power-supply terminal 130 for supplying a power-supply voltage to power amplifier 11; capacitor 13 connected between the ground and node 14 that is located between inductor 12 and power-supply terminal 130; module substrate 70 including principal surfaces 71 and 72 opposite to each other; and a plurality of post electrodes 90 disposed on principal surface 72. In radio frequency module 1, inductor 12 is disposed on principal surface 71 or inside of module substrate 70, and at least one of power amplifier 11 or capacitor 13 is disposed on principal surface 72.

In this configuration, power amplifier 11, and inductor 12 and capacitor 13 that are connected to the power-supply line for supplying a power-supply voltage to power amplifier 11 are disposed on both principal surfaces of module substrate 70 in a distributed manner. This configuration thus achieves the downsizing of radio frequency module 1.

Also, in radio frequency module 1 according to the present embodiment, for example, one of power amplifier 11 and capacitor 13 may be disposed on principal surface 71, and the other of power amplifier 11 and capacitor 13 may be disposed on principal surface 72.

In this configuration, capacitor 13 is disposed on the principal surface that is opposite to the principal surface on which power amplifier 11 is disposed. This configuration thus enables to dispose module substrate 70 between power amplifier 11 and capacitor 13, thereby attenuating the risk of capacitor 13 being destroyed by heat emitted from power amplifier 11.

Also, in radio frequency module 1 according to the present embodiment, for example, power amplifier 11 may be disposed on principal surface 71, and capacitor 13 may be disposed on principal surface 72.

In this configuration, power amplifier 11 is disposed on principal surface 71 that is opposite to principal surface 72 on which a plurality of post electrodes 90 are disposed. This configuration thus improves the heat dissipation of power amplifier 11.

Also, in radio frequency module 1 according to the present embodiment, for example, in a plan view of module substrate 70, at least part of capacitor 13 may overlap at least part of inductor 12.

This configuration has a reduced wiring length between capacitor 13 and inductor 12, thus reducing noise entry into the wiring between capacitor 13 and inductor 12. It is highly unlikely that capacitor 13 is able to remove noise which enters the wiring between capacitor 13 and inductor 12. As such, reduction in the wiring length between capacitor 13 and inductor 12 is effective in improving the electrical characteristics (e.g., noise figure (NF) characteristics) of radio frequency module 1.

Also, in radio frequency module 1 according to the present embodiment, for example, capacitor 13 and inductor 12 may be interconnected by way of via-conductor 74 located inside of module substrate 70.

This configuration has a further reduced wiring length between capacitor 13 and inductor 12, thus further reducing noise entry into the wiring between capacitor 13 and inductor 12.

Also, in radio frequency module 1 according to the present embodiment, for example, in a plan view of module substrate 70, capacitor 13 may not overlap power amplifier 11.

In this configuration, capacitor 13 is disposed spaced apart from power amplifier 11. This configuration thus reduces the risk of capacitor 13 being destroyed by heat emitted from power amplifier 11.

Also, in radio frequency module 1 according to the present embodiment, for example, in a plan view of module substrate 70, post electrode 90G included in a plurality of post electrodes 90 may overlap power amplifier 11, and power amplifier 11 may be connected to post electrode 90G by way of via-conductor 75 located inside of module substrate 70.

In this configuration, heat generated by power amplifier 11 is transferred to outside of radio frequency module 1 by way of via-conductor 75 and post electrode 90G. This configuration thus improves the heat dissipation of power amplifier 11.

Communication device 8 according to the present embodiment includes RFIC 6 that processes a radio frequency signal, and radio frequency module 1 that transfers the radio frequency signal processed by RFIC 6.

This configuration enables communication device 8 to achieve the same effects as those achieved by radio frequency module 1.

Embodiment 2

The following describes Embodiment 2. The present embodiment is different from Embodiment 1 described above mainly in the component disposition of the radio frequency module. The following focuses on the difference from Embodiment 1 to describe the radio frequency module according to the present embodiment.

Figure 4:
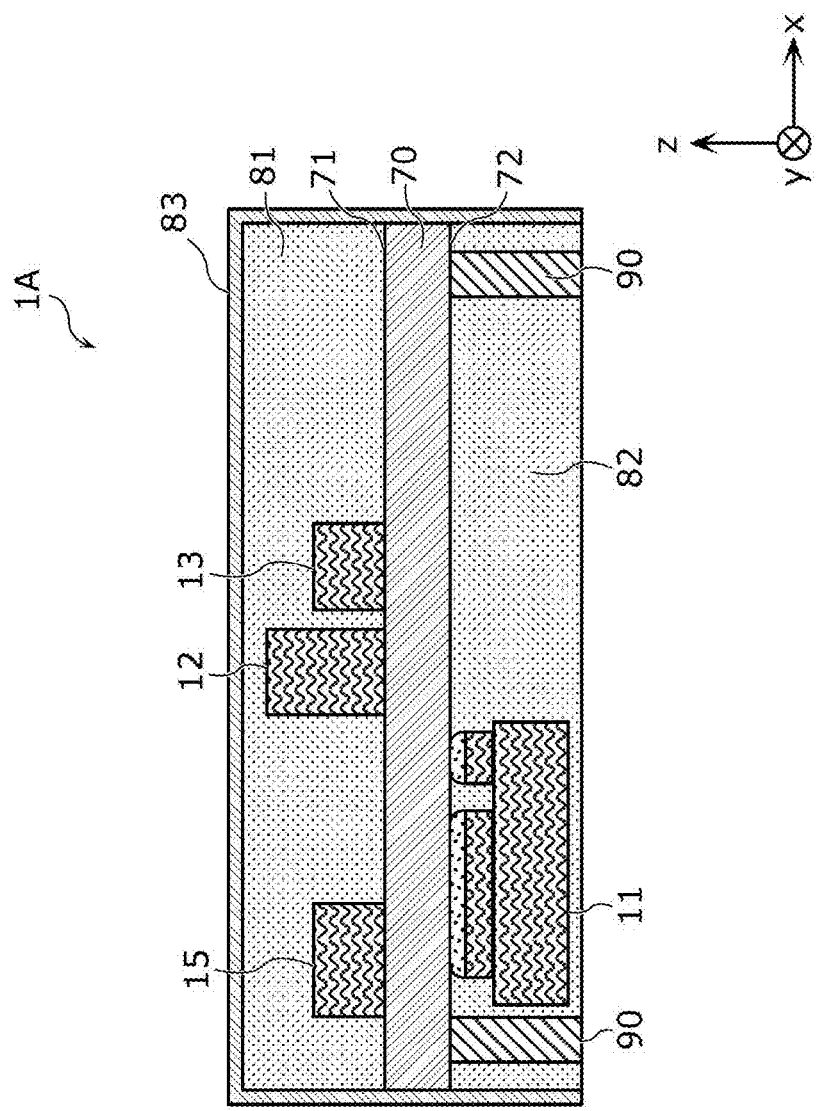
FIG. 4 is a cross-sectional view of the radio frequency module according to Embodiment 2.

With reference to FIG. 4, the following describes the component disposition of radio frequency module 1A according to the present embodiment. FIG. 4 is a cross-sectional view of radio frequency module 1A according to Embodiment 2.

As shown in FIG. 4, in radio frequency module 1A according to the present embodiment, inductor 12, capacitor 13, and matching circuit 15 are disposed on principal surface 71 of module substrate 70. Meanwhile, power amplifier 11 and a plurality of post electrodes 90 are disposed on principal surface 72 of module substrate 70.

As described above, even with configuration in which capacitor 13 is disposed on principal surface 71 and power amplifier 11 is disposed on principal surface 72, power amplifier 11, inductor 12, and capacitor 13 are disposed on both principal surfaces of module substrate 70 in a distributed manner. This configuration thus achieves the downsizing of radio frequency module 1A. This configuration further enables capacitor 13 to be disposed on principal surface 71, which is opposite to principal surface 72 on which power amplifier 11 is disposed. This configuration thus attenuates the risk of capacitor 13 being destroyed by heat emitted from power amplifier 11.

Embodiment 3

The following describes Embodiment 3. The present embodiment is different from Embodiment 1 described above mainly in the component disposition of the radio frequency module. The following focuses on the difference from Embodiment 1 to describe the radio frequency module according to the present embodiment.

Figure 5:
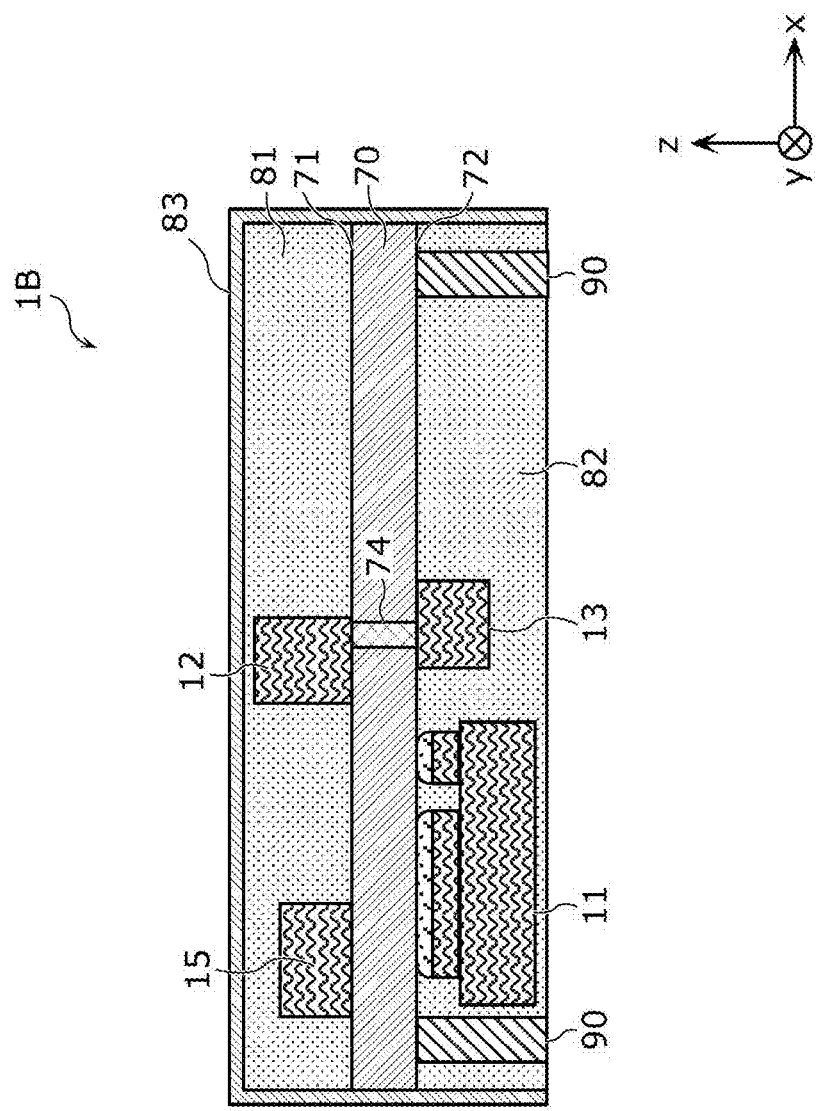
FIG. 5 is a cross-sectional view of the radio frequency module according to Embodiment 3.

With reference to FIG. 5, the following describes the component disposition of radio frequency module 1B according to the present embodiment. FIG. 5 is a cross-sectional view of radio frequency module 1B according to Embodiment 3.

As shown in FIG. 5, in radio frequency module 1B according to the present embodiment, inductor 12 and matching circuit 15 are disposed on principal surface 71 of module substrate 70. Meanwhile, power amplifier 11, capacitor 13, and a plurality of post electrodes 90 are disposed on principal surface 72 of module substrate 70.

As described above, even with configuration in which both power amplifier 11 and capacitor 13 are disposed on principal surface 72 of module substrate 70, power amplifier 11, inductor 12, and capacitor 13 are disposed on both principal surfaces of module substrate 70 in a distributed manner. This configuration thus achieves the downsizing of radio frequency module 1B.

Embodiment 4

The following describes Embodiment 4. The present embodiment is different from Embodiment 1 described above mainly in that the radio frequency module includes a plurality of bump electrodes instead of a plurality of post electrodes. With reference to the drawings, the following focuses on the difference from Embodiment 1 to describe the present embodiment.

Figure 6:
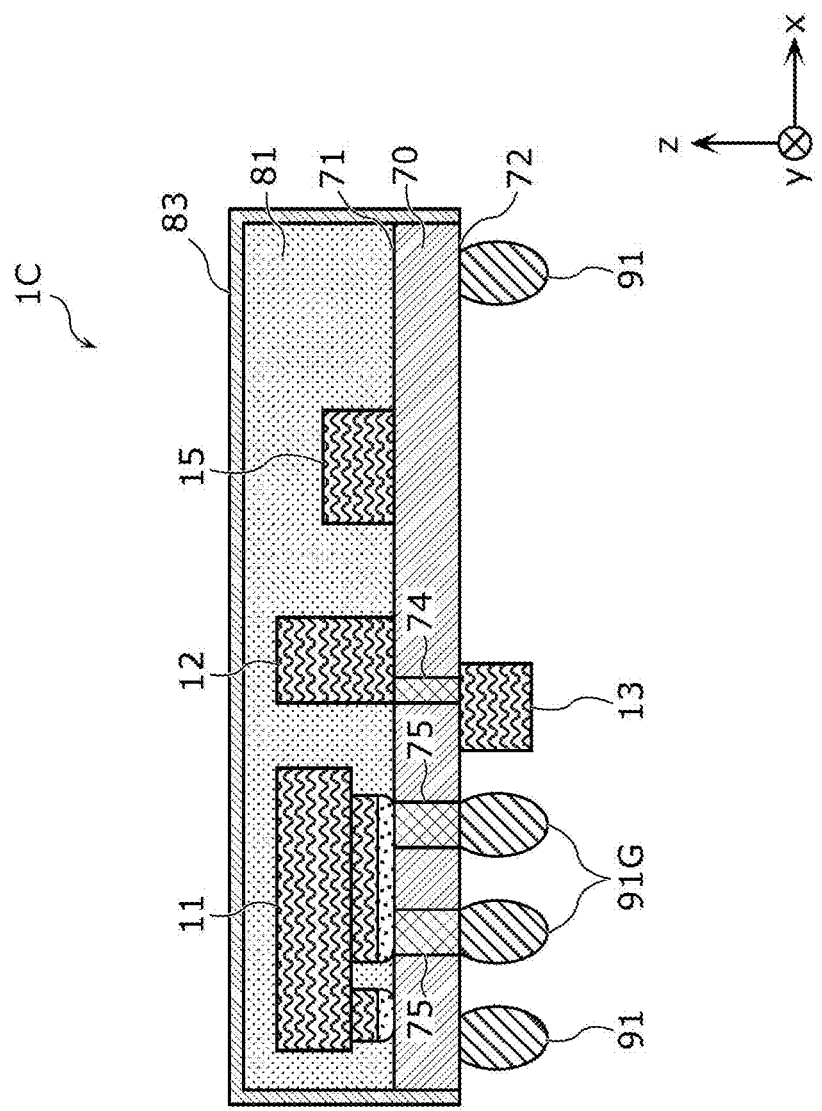
FIG. 6 is a cross-sectional view of the radio frequency module according to Embodiment 4.

With reference to FIG. 6, the following describes the component disposition of radio frequency module 1C according to the present embodiment. FIG. 6 is a cross-sectional view of radio frequency module 1C according to Embodiment 4.

As shown in FIG. 6, radio frequency module 1C according to the present embodiment includes a plurality of bump electrodes 91 instead of a plurality of post electrodes 90. Power amplifier 11 is connected by way of via-conductors 75 to bump electrodes 91G that is implemented as electrodes for heat dissipation. Radio frequency module 1C does not include resin member 82 at the side of principal surface 72.

As described above, radio frequency module 1C includes, as a plurality of external-connection terminals, a plurality of bump electrodes 91 instead of a plurality of post electrodes 90.

Radio frequency module 1C with the above configuration also achieves the same effects as those achieved by Embodiment 1.

Another Embodiment

The radio frequency module and the communication device according to the present disclosure have been described above, using the embodiments, but the radio frequency module and the communication device according to the present disclosure are not limited to such embodiments. The present disclosure also includes: another embodiment achieved by freely combining structural elements in the embodiments; variations achieved by making various modifications to the embodiments that can be conceived by those skilled in the art without departing from the essence of the present disclosure; and various devices that include the radio frequency module and the communication device described above.

For example, in the circuit configurations of the radio frequency module and the communication device according to the foregoing embodiments, another circuit element, wiring, and so forth may be present in a path that connects each circuit element and a signal path disclosed in the drawings. In FIG. 1, a matching circuit, for example, may be interposed between low-noise amplifier 21 and reception filter 26.

The configuration of the power amplifier is not limited to a particular configuration, such as those described above. For example, the power amplifier may include a plurality of cascaded amplifiers and/or a differential amplifier.

Inductor 12 in the foregoing embodiments is disposed on principal surface 71 of module substrate 70, but the present disclosure is not limited to this disposition. Inductor 12 thus may be disposed, for example, inside of module substrate 70. In this case, inductor 12 may be implemented, for example, as a wiring trace inside of module substrate 70. Alternatively, inductor 12 may also be implemented, for example, as an integrated passive device (IPD) embedded inside of module substrate 70.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is widely applicable for use in a communication device (e.g., mobile phone) as a radio frequency module that is placed at the front-end portion.

The invention claimed is:

1. A radio frequency module, comprising:
a power amplifier;
an inductor connected between the power amplifier and a power-supply terminal to supply a power-supply voltage to the power amplifier;
a capacitor connected between a ground and a node that is located between the inductor and the power-supply terminal;
a module substrate including a first principal surface and a second principal surface opposite to each other; and
a plurality of external-connection terminals disposed on the second principal surface,
wherein the power amplifier is disposed on the first principal surface and one of the capacitor and the inductor is disposed on the first principal surface or inside of the module substrate, and
an other of the capacitor and the inductor is disposed on the second principal surface, and
wherein in a plan view of the module substrate, the power amplifier does not overlap either of the capacitor and the inductor.

2. The radio frequency module according to claim 1, wherein
the capacitor is disposed on the second principal surface.

3. The radio frequency module according to claim 2, wherein
the inductor is disposed on the first principal surface.

4. The radio frequency module according to claim 1, wherein in a plan view of the module substrate, at least part of the capacitor overlaps at least part of the inductor.

5. The radio frequency module according to claim 4, wherein the capacitor and the inductor are interconnected via a via-conductor located inside of the module substrate.

6. The radio frequency module according to claim 1, wherein in a plan view of the module substrate, the capacitor does not overlap the power amplifier.

7. The radio frequency module according to claim 1, wherein in a plan view of the module substrate, at least one of the plurality of external-connection terminals overlaps the power amplifier, and
the power amplifier is connected to the at least one of the plurality of external-connection terminals via a via-conductor located inside of the module substrate.

8. The radio frequency module according to claim 1, wherein the inductor is disposed inside the module substrate such that the inductor is at least partially within the module substrate and at least partially beneath a plane of the first principle surface of the module substrate.

9. The radio frequency module according to claim 1, wherein the inductor is disposed inside the module substrate such that the inductor is within the module substrate and fully below a plane of the first principle surface of the module substrate.

10. The radio frequency module according to claim 1, wherein the inductor is encapsulated within the module substrate below a plane of the first principle of the module substrate.

11. A communication device, comprising:
a signal processing circuit configured to process a radio frequency signal; and
a radio frequency module configured to transfer the radio frequency signal processed by the signal processing circuit, the radio frequency module including
a power amplifier,
an inductor connected between the power amplifier and a power-supply terminal to supply a power-supply voltage to the power amplifier,
a capacitor connected between a ground and a node that is located between the inductor and the power-supply terminal,
a module substrate including a first principal surface and a second principal surface opposite to each other, and
a plurality of external-connection terminals disposed on the second principal surface, wherein the power amplifier is disposed on the first principal surface and one of the capacitor and the inductor is disposed on the first principal surface or inside of the module substrate, and an other of the capacitor and the inductor is disposed on the second principal surface, and wherein in a plan view of the module substrate, the power amplifier does not overlap either of the capacitor and the inductor.

12. The communication device according to claim 11, wherein
the capacitor is disposed on the second principal surface of the module substrate.

13. The communication device according to claim 12, wherein
the inductor is disposed on the first principal surface.

14. The communication device according to claim 11, wherein in a plan view of the module substrate, at least part of the capacitor overlaps at least part of the inductor.

15. The communication device according to claim 14, wherein the capacitor and the inductor are interconnected via a via-conductor located inside of the module substrate.

16. The communication device according to claim 11, wherein in a plan view of the module substrate, the capacitor does not overlap the power amplifier.

17. The communication device according to claim 11, wherein in a plan view of the module substrate, at least one of the plurality of external-connection terminals overlaps the power amplifier, and
the power amplifier is connected to the at least one of the plurality of external-connection terminals via a via-conductor located inside of the module substrate.

18. The communication device according to claim 11, wherein the inductor is disposed inside the module substrate such that the inductor is at least partially within the module substrate and at least partially beneath a plane of the first principle surface of the module substrate.

19. The communication device according to claim 11, wherein the inductor is disposed inside the module substrate such that the inductor is within the module substrate and fully below a plane of the first principle surface of the module substrate.

20. The communication device according to claim 11, wherein the inductor is encapsulated within the module substrate below a plane of the first principle of the module substrate.

* * * * *